United States Patent [19]

Perlini

[11] Patent Number: 4,460,196
[45] Date of Patent: Jul. 17, 1984

[54] SUSPENSION SYSTEM FOR COUPLED VEHICLE AXLES

[76] Inventor: Roberto Perlini, 37047 S. Bonifacio, Corso Venezia 93, Italy

[21] Appl. No.: 417,539

[22] Filed: Sep. 13, 1982

[30] Foreign Application Priority Data

Dec. 23, 1981 [IT] Italy ............................. 68672 A/81

[51] Int. Cl.³ .............................................. B60G 5/00
[52] U.S. Cl. .................................................... 280/676
[58] Field of Search ............... 280/104, 676, 682, 683, 280/684, 685, 686, 687

[56] References Cited

U.S. PATENT DOCUMENTS

| 2,427,006 | 9/1947 | Knox | 280/685 |
| 2,795,434 | 6/1957 | Gouirand | 280/684 |
| 3,572,745 | 3/1971 | Willetts | 280/685 |

Primary Examiner—David M. Mitchell
Assistant Examiner—Kenneth R. Rice
Attorney, Agent, or Firm—Harding, Earley, Follmer & Frailey

[57] ABSTRACT

A suspension system for coupled truck axles, comprising a pair of rigid arms each pivotally mounted at one end on a central pivot projecting from the truck frame and at the other end to one of a pair of axles. Each of the rigid arms has an upwardly projecting bracket portion for mounting therebetween resilient means adapted to be deformed by the oscilltions of the rigid arms about the central pivot to receive the load on the truck and compensate for differences in height between the pair of axles. One of the rigid arms on each side of the truck is designed to resist transverse thrust, whereas the other is to a limited extent movable in the transverse direction by means of ball joints.

10 Claims, 6 Drawing Figures

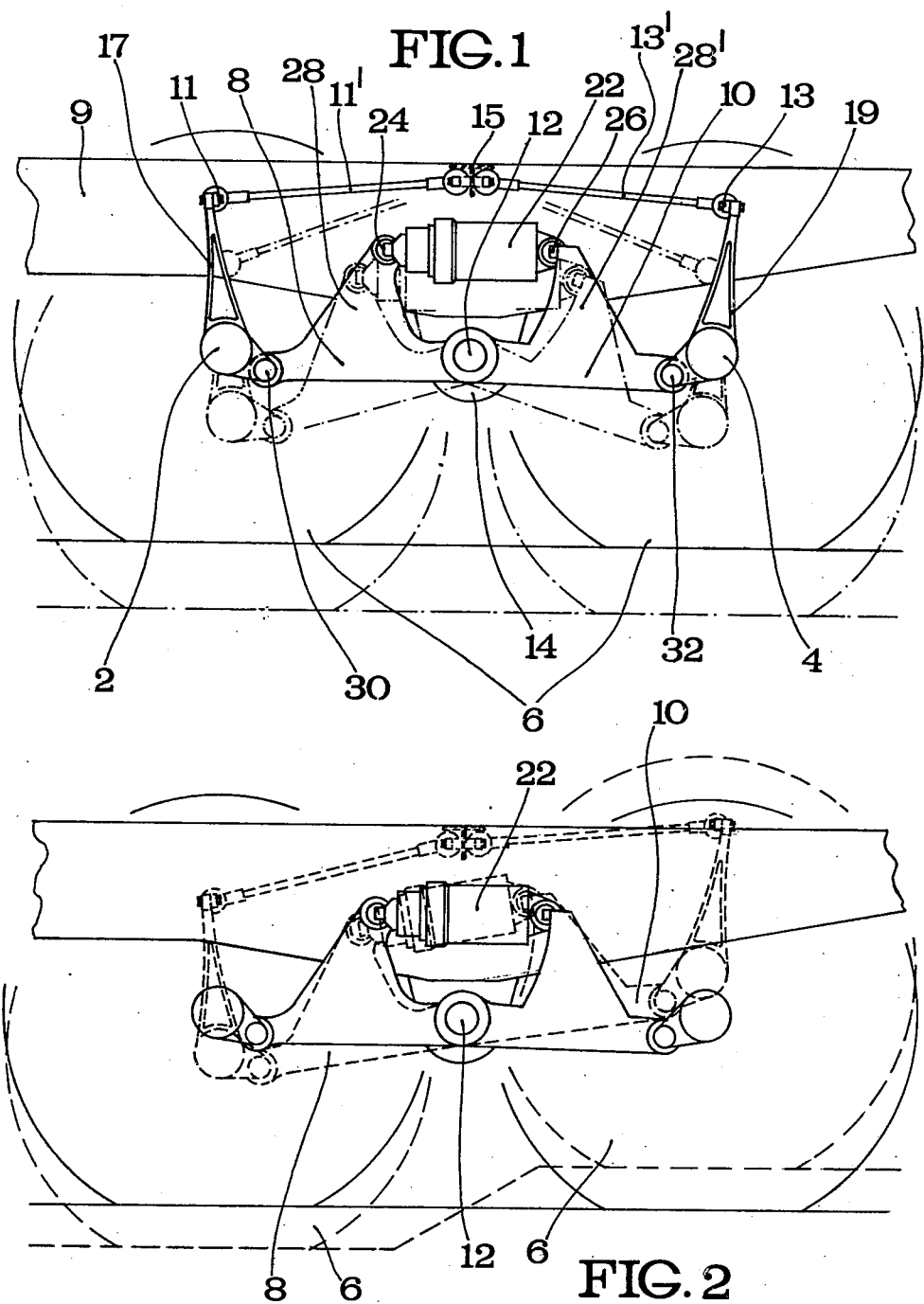

SUSPENSION SYSTEM FOR COUPLED VEHICLE AXLES

BACKGROUND OF THE INVENTION

This invention relates to a suspension system for coupled truck axles.

In the conventional suspension systems for coupled truck axles, the axles are connected to the vehicle frame by resilient means. One of the suspension systems which at present is most commonly used is the so-called "cantilever" suspension in which a semielliptic leaf spring is connected with its ends to the axles and with its center set rigidly in a bracket secured to the center of the vehicle frame. In this suspension system, the leaf spring thus serves both as a resilient suspension member and as a mechanical connection member and has to support not only the vertical load but also the transverse thrust and the twisting stress as is known in the art.

To enable the leaf springs to support all the aforementioned stresses and strains, the springs had to be excessively dimensioned to the detriment of their resilient properties which have been sacrificed to sturdiness and thus rigidity. In fact, one of the most evident drawbacks of the conventional suspension systems for coupled truck axles is that they afford little driving comfort because they do not adequately compensate for the unevennesses of the ground due to the use of springs that are too rigid. Thus, such unevennesses of the ground produce vibrations and stresses which are deleterious to the entire structure of the vehicle.

Attempts have been made to solve this problem at least partially. Essentially these attempts have been directed to provide improved spring means and for this purpose it has been proposed to arrange tie rods in the form of a triangle above the springs between the axles and the center of the vehicle frame to relieve the springs at least in part from the transverse thrust. However, the obtained results are not completely satisfactory as such a solution cannot but be a compromise which permits the spring to be simultaneously a mechanical connection member and a resilient suspension means.

It is therefore an object of the present invention to provide a suspension system for coupled truck axles, which eliminates or at least partially overcomes the drawbacks of the conventional systems and permits the use of resilient means which is not the result of a compulsory necessity but can be selected and designed to adequately and efficiently meet any requirement of use and environment that may be encountered by the vehicle. In this manner it is possible to ensure a high level of comfort for the driver and absorb the vibrations produced by the unevennesses of the ground.

SUMMARY OF THE INVENTION

The invention provides a suspension system for coupled truck axles, which comprises a pair of rigid arms on each side of the vehicle, one end of each of these arms being pivotally connected to a single central pivot on the vehicle frame and the other or opposite end of each arm being connected to one of the axles, each of these arms being formed with an integral projecting bracket member for mounting resilient means which is thus interposed between the projecting bracket members so that it can be deformed by the oscillations of the latter around the central pivot on the vehicle frame.

Further, on each side of the vehicle one of the rigid arms has a substantially fork-shaped configuration at the end connected to the central pivot on the vehicle frame whereas the other arm has a substantially rod-shaped configuration, the fork-shaped member providing the connection to each of the primary axles on each side of the vehicle. Thus, the suspension system for coupled truck axles according to the invention provides a mechanical connection of the axles to the vehicle frame by rigid mechanical members instead of resilient members.

In the suspension system according to the present invention, the resilient means only serves the purpose of undergoing elastic deformation to compensate for the unevennesses of the ground and thus permit the suspension to take a position in adaptation to the configuration of the ground. The resilient means may be selected from conventional resilient means such as an air or hydraulic cylinder or a spring as required or most suitable for each particular case.

BRIEF DESCRIPTION OF THE DRAWINGS

FIG. 1 is a schematic side elevational view of a preferred embodiment of the suspension system according to the invention, the suspension system being shown with the vehicle on flat ground, the full line position illustrating the loaded position of the suspension system and the dash-and-dot line position the unloaded position illustrating of the suspension system;

FIG. 2 is a schematic side elevational view of the suspension system as in FIG. 1 in the loaded condition, the full line position indicating the position of the suspension system with the vehicle on flat ground and the dash line position indicating the position of the suspension system with the vehicle on uneven ground;

DESCRIPTION OF PREFERRED EMBODIMENTS

Figure 3:
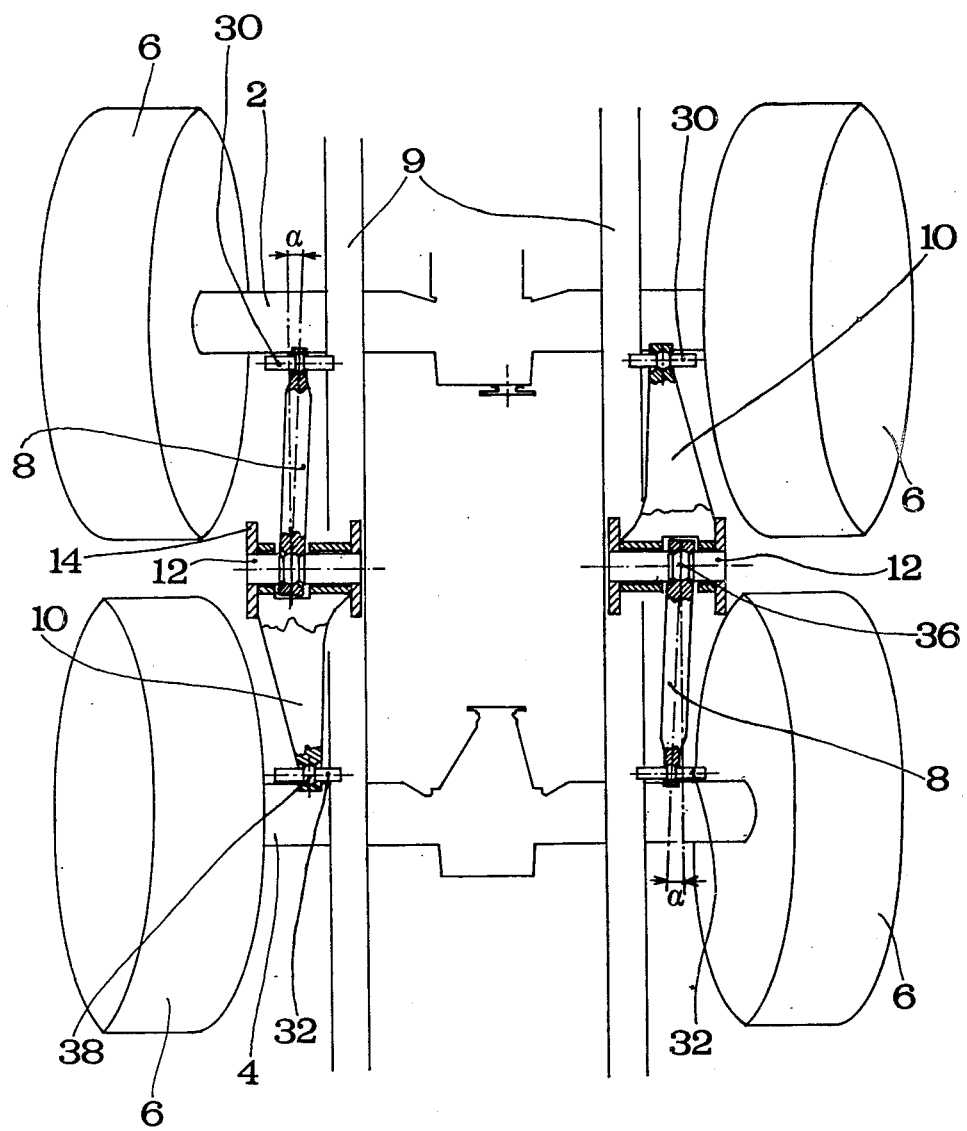
FIG. 3 is a fragmentary schematic top plan view, partly in section, of the suspension system according to the invention.

Referring to FIG. 1, a pair of rigid arms 8 and 10 is rotatably connected at the inner ends thereof to a central pivot 12 located in a bracket 14 formed integrally with a vehicle frame 9. The outer ends of the arms 8 and 10 are connected to axles 2 and 4 of the vehicle by connecting rods connected to said rigid arms by ball joint pivots 30 and 32. Rigid arms 8 and 10 are formed integrally with projecting brackets 28 and 28' to the ends of which the ends of an air cylinder 22 are connected by pivots 24 and 26. Air cylinder 22 forms the resilient means of the suspension.

Thus the load of the vehicle is received by the central pivot 12 which transmits it through arms 8 and 10 to the axles 2 and 4 and therefrom to wheels 6 of the vehicle. The distribution of the load to the two axles is predetermined by the characteristics of design of the arms 8 and 10 and then remains constant in any position that the system may take around the pivot 12.

The dash-and-dot line position in FIG. 1 indicates the position of the suspension in the unloaded condition of the vehicle. In this position the arms are located at an angle to each other and the vehicle frame is located at a certain height from the ground and the air cylinder forming the resilient means is in an extended position. The full line position in FIG. 1 indicates the position of the suspension in the loaded condition of the vehicle. In this position the central pivot 12 is located nearer the ground and arms 8 and 10 are stretched so that pivots 24 and 26 of projecting brackets 28 and 28' are closer to each other. In this situation the resilient means has retracted to dampen the stretching effect of the load on arms 8 and 10.

The suspension system further comprises connecting rods 17 and 19 each connected at one end to one of the axles and at the other end by means of articulated joints 11 and 13 to upper tie rods 11' and 13' which in turn are connected by means of an articulated joint 15 to the vehicle frame as is known in the art, mainly to control the braking torque.

The dash line position in FIG. 2 indicates the position of the suspension when the vehicle is on uneven ground having holes or elevations in the vicinity of the wheels 6 of the vehicle. Due to the unevenness of the ground, the angular position of the arms 8 and 10 about the central pivot 12 varies, resulting in deformation of the resilient means 22 which immediately absorbs such variations. Consequently, arms 8 and 10 oscillate about central pivot 12 and the distribution of load on the axles remains unchanged.

FIG. 3 is a top plan view of the suspension system, partly in section, and illustrates further details of construction. For greater clarity of the drawing, the resilient means and the projecting brackets of the arms supporting it are not shown in FIG. 3.

On each side of the vehicle one of the two arms, 10 in FIG. 3, widens toward its inner end connected to the central pivot 12, thus forming a forked configuration. Further, on each side of the vehicle, the outer ends of arms 10 are alternatively connected to axle 2 and 4, respectively. With this configuration the suspension system is capable of withstanding lateral thrust produced by centrifugal force when the vehicle is negotiating a curve, or by the force of the gravity component when the vehicle is running on transversely inclined ground, or by the action of the wind or by any other force acting in the transverse direction.

Pivots 30 connect rigid arms 8 and 10 to axle 2 through connecting rods not shown in FIG. 3 and pivots 32 similarly connect them to axle 4. As mentioned above, the rigid arms 8 and 10 are connected to each other and to the vehicle frame 9 by the central pivot 12. All these connections are made by ball joints, such as 36 and 38, adapted to oscillate with a limited degree of freedom of axial movement in their respective seats of articulation.

Thus, the overall suspension system has a certain degree of freedom of movement in its articulations to ensure perfect adhesion of the wheels on rough or uneven ground having holes or elevations. For this purpose arm 8 is in the form of a rod having ball joints at both ends to permit it to move with a relatively large degree of freedom of movement between the central pivot 12 and the axle. The articulatory movement that the arm 8 can perform, when projected to the horizontal plane, is within an angle α shown in FIG. 3 and, when projected to the vertical plane, is within the angle β shown in FIG. 4.

Thus, each axle is connected to the vehicle frame by the arm 10, which withstands transverse thrust on the vehicle and is free to move only in the vertical direction, and by the arm 8 which maintains the connection of the axle to the vehicle frame in any position that the axle may take by moving about its point of pivotal connection 30 or 32 with the arm 10. The fork-shaped arms 10 provide the primary connection of the suspension system to the axles 2 and 4 on each side of the vehicle, while the rod-shaped arms 8, by reason of their ball joints at each end, are articulatory both vertically and transversely relative to the arms 10.

Figure 4:
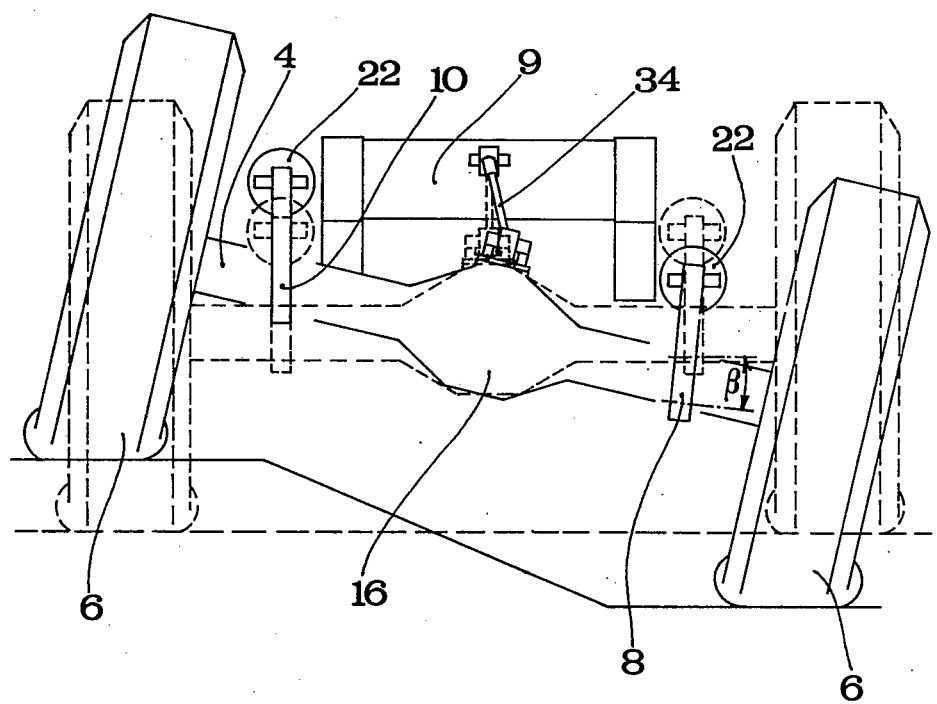
FIG. 4 is a schematic rear elevational view of the embodiment of FIGS. 1 and 2, the position of the suspension system with the vehicle on flat ground being shown by dash lines and the position of the suspension system with the vehicle on uneven ground being shown by full lines.

FIG. 4 is a rear elevational view showing the position of the suspension system in the presence or absence of differences of height between the wheels 6 of one axle 4. Whereas the arm 10 is characterized by rigidity in the transverse direction because its inner end connected to the central pivot 12 is fork-shaped, and therefore can move only vertically, the arm 8 can also perform a translating movement about the angle β. As seen from the rear, the arm 8 is therefore in an oblique position with its upper projecting bracket connected to air cylinder 22.

FIG. 4 also shows axle casing 16 movably connected to vehicle frame 9 by torque tie rod 34 and associated articulated joints, as is known in the art.

Figure 5:
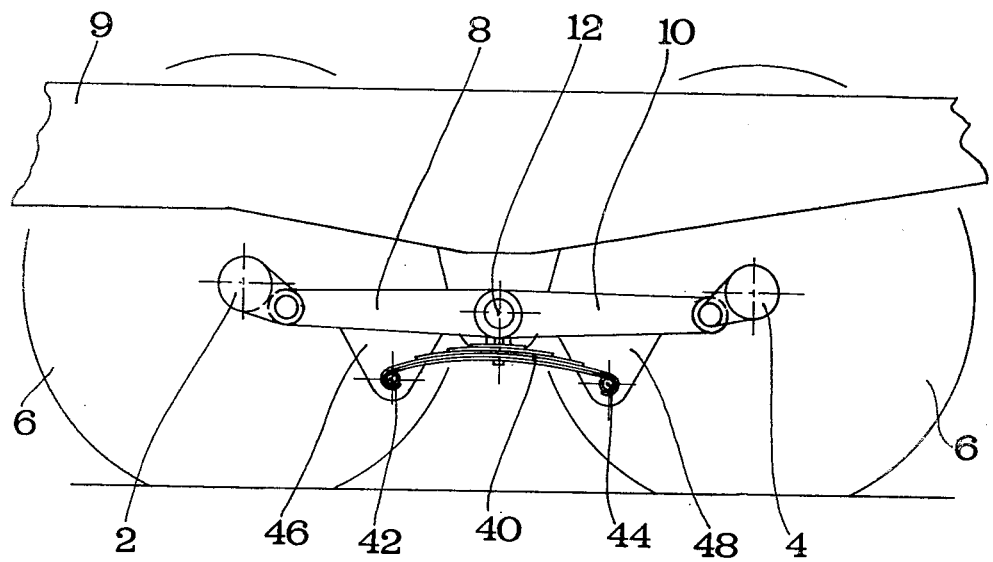
FIG. 5 is a schematic side elevational view of another embodiment of the suspension system according to the invention, wherein the resilient means is formed by a leaf spring.

It will thus be evident from the foregoing description that the suspension system for coupled truck axles according to the present invention provides a connection of the axles to the vehicle frame by mechanical members instead of resilient means. Therefore, in the present suspension system the resilient means may be selected from those having the caracteristics most suitable for the intended use of the vehicle. Although in the preferred embodiment described above the resilient means is an air cylinder, obviously the invention is not limited to this form of resilient means. In fact, FIG. 5 shows another embodiment of the invention in which the resilient means is formed by a leaf spring 40 connected at its ends to a pair of downwardly projecting brackets 46 and 48 formed integrally with the rigid arms 8 and 10. The eyelets at the ends of the leaf springs are secured to projecting brackets 46 and 48 of rigid arms 8 and 10 by means of pins 42 and 44 thereon. The vehicle frame 9 is again secured with its central pivot 12 to axles 2 and 4 through rigid arms 8 and 10.

Figure 6:
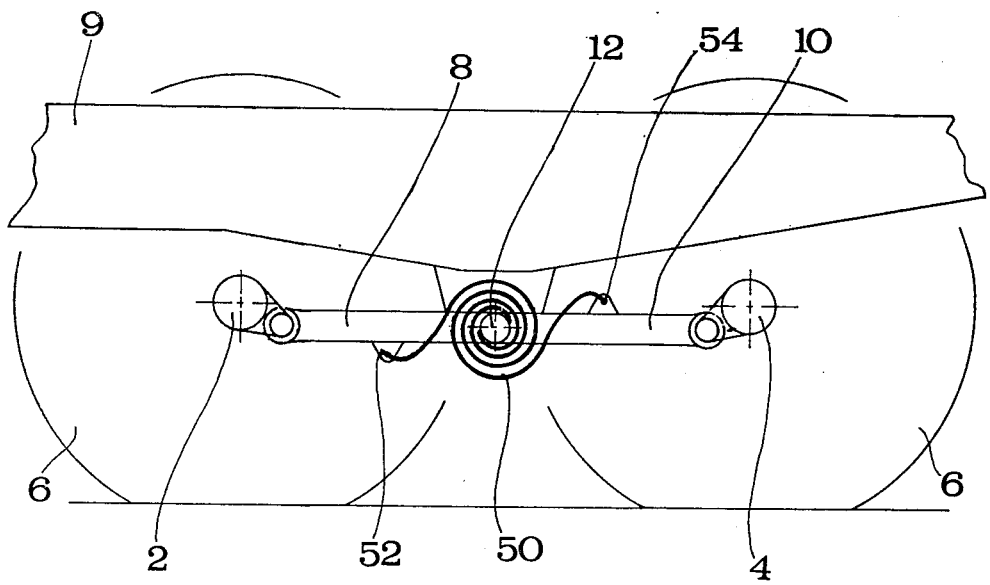
FIG. 6 is a schematic side elevational view of a further embodiment of the suspension system according to the invention, wherein the resilient means is formed by a coil spring.

FIG. 6 shows a further embodiment of the invention in which the resilient means is formed by a coil spring 50. The ends of coil spring 50 are secured to a pair of projecting brackets 52 and 54 formed integrally with rigid arms 8 and 10 and projecting downwardly and upwardly respectively, in opposite directions. The connection of axles 2 and 4 to the vehicle frame 9 is again made by rigid arms 8 and 10 rotatably connected to the central pivot 12 on the vehicle frame.

Additionally, the resilient means may comprise a hydraulic cylinder, or it may comprise any selected combination of an air cylinder or a hydraulic cylinder with springs, for example, of the types illustrated in FIGS. 5 and 6.

Due to its sturdiness and excellent spring capacity, the suspension system for coupled axles according to the present invention is particularly suitable for trucks intended to be used on very uneven ground such as in quarries and building yards. However, the same characteristics also make it excellent for use on less uneven ground and normal roads.

Although some preferred embodiments of the invention have thus been described in detail and illustrated in the accompanying drawings, it is to be understood that the invention is not limited to these precise embodiments and that numerous changes and modifications obvious to one skilled in the art may be made therein without departing from the scope of the invention as defined by the appended claims.

I claim:

1. An articulated suspension system for coupled vehicle axles having a pair of rigid arms on each side of the vehicle, one end of each of said arms being connected pivotally to a single transverse pivot on the vehicle and the other end of said arms being connected to one of said axles, a projecting bracket member formed on each of said arms and resilient means interposed between and connected to said projecting bracket members, said resilient means being deformable by oscillatory movements of said projecting bracket members around said pivot, characterized by
   (a) one arm of said pair of arms on each side of the vehicle having a substantially fork-shaped configuration at the end thereof connected to said pivot,
   (b) each said fork-shaped arm being oscillatory about the pivot and being non-movable transversely relative to the vehicle to thereby resist transverse thrust on the vehicle,
   (c) the other arm of said pair of arms on each side of the vehicle having a substantially rod-shaped configuration and
   (d) articulation means connecting each said rod-shaped arm to said pivot and to one of said axles to render each said rod-shaped arm oscillatory about the pivot and transversely relative to the vehicle,
   (e) whereby said articulated suspension system is operative to maintain wheels on the vehicle in contact with uneven ground without change in distribution of load on the axles.

2. A suspension system for coupled vehicle axles as claimed in claim 1, characterized by
   (a) the fork-shaped arms on each side of the vehicle being connected to different axles, said fork-shaped arms providing the primary connection of the suspension system to the axles, and
   (b) each rod-shaped arm being articulatory relative to the fork-shaped arm on the other side of the vehicle.

3. A suspension system for coupled vehicle axles as claimed in claim 1, characterized by ball joints connecting the rod-shaped arms to said pivot.

4. A suspension system for coupled vehicle axles as claimed in claim 1, characterized by ball joints connecting the fork-shaped arms and the rod-shaped arms to the axles.

5. A suspension system for coupled vehicle axles as claimed in claim 1, characterized by each fork-shaped arm and each rod-shaped arm being connected to the axles by connecting rods and ball socket joints interposed between said connecting rods and said arms.

6. A suspension system for coupled vehicle axles as claimed in claim 1, characterized by each axle being connected to said vehicle by torque tie rods and articulated joints interposed between said vehicle and said torque tie rods.

7. A suspension system for coupled vehicle axles as claimed in claim 1, characterized by resilient means comprising a fluid cylinder.

8. A suspension system for coupled vehicle axles as claimed in claim 1, characterized by resilient means comprising an air cylinder.

9. A suspension system for coupled vehicle axles as claimed in claim 1, characterized by resilient means comprising a spring.

10. A suspension system for coupled vehicle axles as claimed in claim 1, characterized by resilient means comprising a combination of a fluid cylinder and a spring.

* * * * *